United States Patent [19]

Stöhr et al.

[11] Patent Number: 5,040,664

[45] Date of Patent: Aug. 20, 1991

[54] SHAVINGS CONVEYOR

[75] Inventors: Albert Stöhr, Markt Schwaben; Alfred Rehle, Munich, both of Fed. Rep. of Germany

[73] Assignee: Gebr. Hennig GmbH, Fed. Rep. of Germany

[21] Appl. No.: 505,225

[22] Filed: Apr. 5, 1990

[30] Foreign Application Priority Data

Apr. 13, 1989 [DE] Fed. Rep. of Germany ....... 3912187

[51] Int. Cl.⁵ ............................................. B65G 19/18
[52] U.S. Cl. ..................................... 198/718; 198/719
[58] Field of Search ..................... 198/718, 719, 832.2, 198/502.4, 502.1

[56] References Cited

U.S. PATENT DOCUMENTS

| | | | |
|---|---|---|---|
| 3,589,504 | 6/1971 | Blough | 198/719 |
| 3,738,503 | 6/1973 | Wallis | 198/719 X |
| 4,858,747 | 8/1989 | Eunson | 198/719 X |

FOREIGN PATENT DOCUMENTS

| | | | |
|---|---|---|---|
| 0020149 | 12/1980 | European Pat. Off. | 198/718 |
| 0162773 | 10/1964 | U.S.S.R. | 198/719 |
| 0785141 | 12/1980 | U.S.S.R. | 198/719 |

Primary Examiner—D. Glenn Dayoan
Attorney, Agent, or Firm—Thomas, Kerr & Kayden

[57] ABSTRACT

This invention relates to a shavings conveyor having a reversing contactor for protecting the drive assembly (1) of the shaving conveyor from undue wear caused by the overloading of the shavings conveyor. When the conveyor becomes overloaded, a torque support beam (12), which is attached to the housing of the drive assembly (1), is caused to rotate. A threaded rod (15) is attached at one end to the beam (12) and moves with the displacement of beam (12). An L-shaped chip (20), mounted to the opposite end of threaded rod (15) and having a control cam (21) attached thereon, is moved with the threaded rod (15) so that the control cam (21) attached thereto engages a control switch (22). As the control switch (22) is activated, it signals the motor of the drive assembly to briefly reverse the direction of movement of the shavings conveyor so as to disperse the accumulation of shavings.

11 Claims, 2 Drawing Sheets

SHAVINGS CONVEYOR

FIELD OF THE INVENTION

The invention relates to a shavings conveyor for transporting shavings and the like, which includes a reversing contactor which briefly reverses the direction of the rotation of the conveying element in response to the accumulation of shavings on the conveying element so as to disperse the accumulated shavings.

BACKGROUND OF THE INVENTION

In shavings conveyors (particularly belt or scraper conveyors) disruptions occur occasionally in operation as a result of an accumulation of shavings. Since in this case the conveying element (hinge belt of scraper chain) is more or less jammed, there is a danger of overloading of the drive assembly. In order to protect the drive assembly against overloading when jamming of the conveying element occurs, known shavings conveyors are equipped with a slipping clutch. However, such a construction has various disadvantages. Because of the wear on the clutch discs of the slipping clutch, the torque transmitted by the drive assembly to the conveying element alters. This not only restricts the functional reliability of the shavings conveyor, but also makes undesirable readjustments necessary in the case of automated production plant.

The object of the invention, therefore, is to construct a shavings conveyor in such a way that a reliable protection against overloading of the drive assembly is achieved using simple and largely maintenance-free means.

SUMMARY OF THE INVENTION

In the shavings conveyor according to the invention a reversing contactor is provided which responds in the case of a certain loading of the drive assembly (measured by the deflection of the torque supports) and switches the direction of rotation of the drive assembly over so that the conveying element runs backwards. A timing relay is also provided which, an adjustable time after the response of the reversing contactor, switches the direction of rotation of the drive assembly over so that the conveying element runs forwards.

The brief reversal of the direction in which the conveying element runs, as described above, can be carried out several times if necessary until the accumulation of shavings which triggered the overload protection has been dispersed. Thus manual intervention into the operating cycle in the event of an accumulation of shavings and other jamming is not necessary.

Since the described apparatus ensures a reliable protection against overloading of the drive assembly, in the shavings conveyor according to the invention it is possible to dispense with the installation of a slipping clutch between the drive assembly and the conveying element. Thus over a long period of maintenance-free operation it is ensured that the nominal torque of the drive assembly, which is set once, is transmitted to the conveying element.

BRIEF DESCRIPTION OF THE DRAWINGS

One embodiment of the invention is illustrated in the drawings, in which.

DESCRIPTION OF THE PREFERRED EMBODIMENTS

Figure 1:
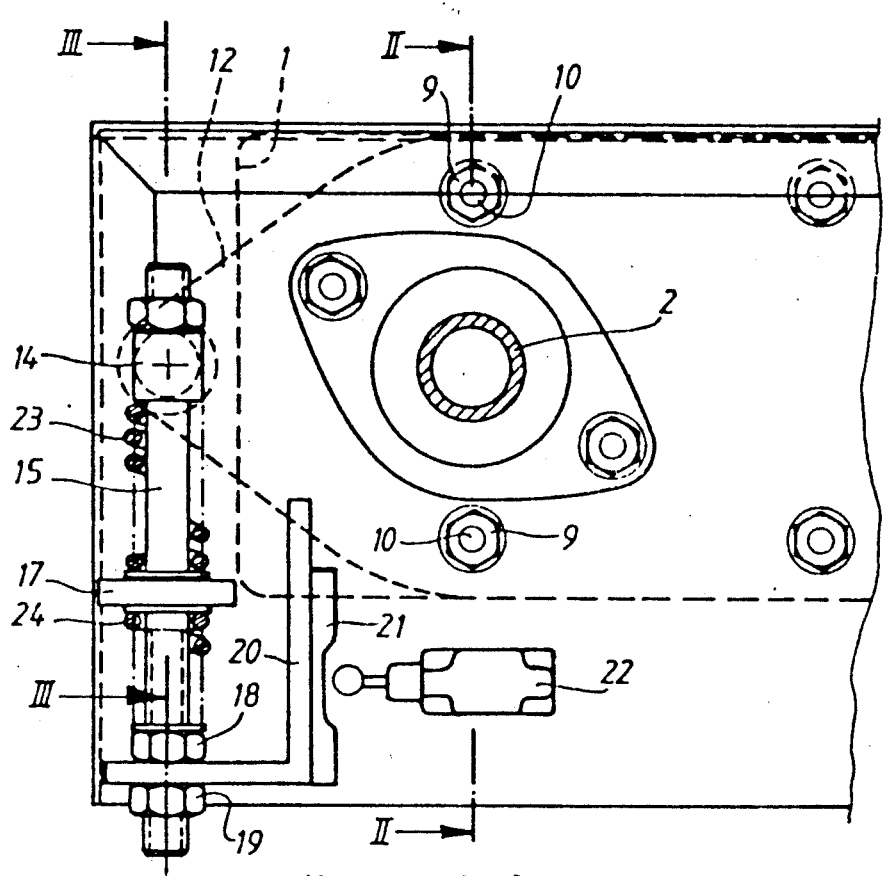
FIG. 1 shows a side view of the mechanical elements of the overload protection arrangement.
Figure 2:
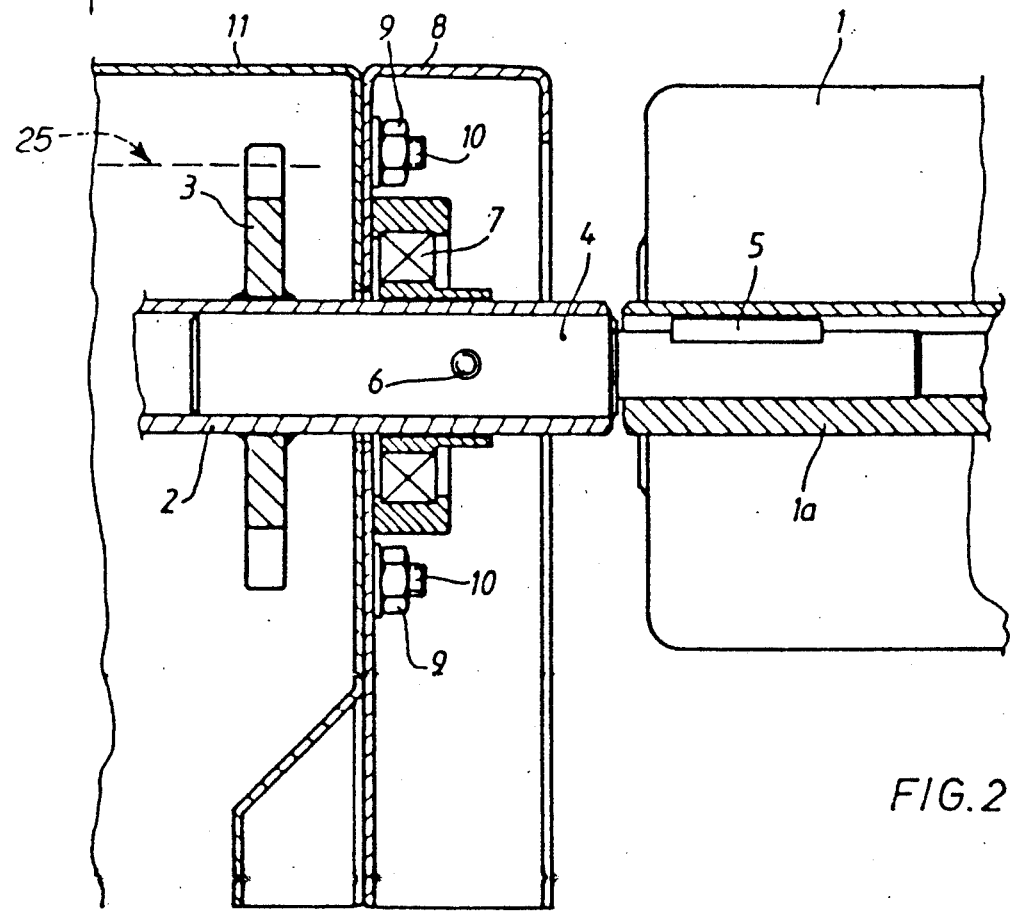
FIGS. 2 and 3 show sections along the line II—II and III—III respectively in FIG. 1.
Figure 3:
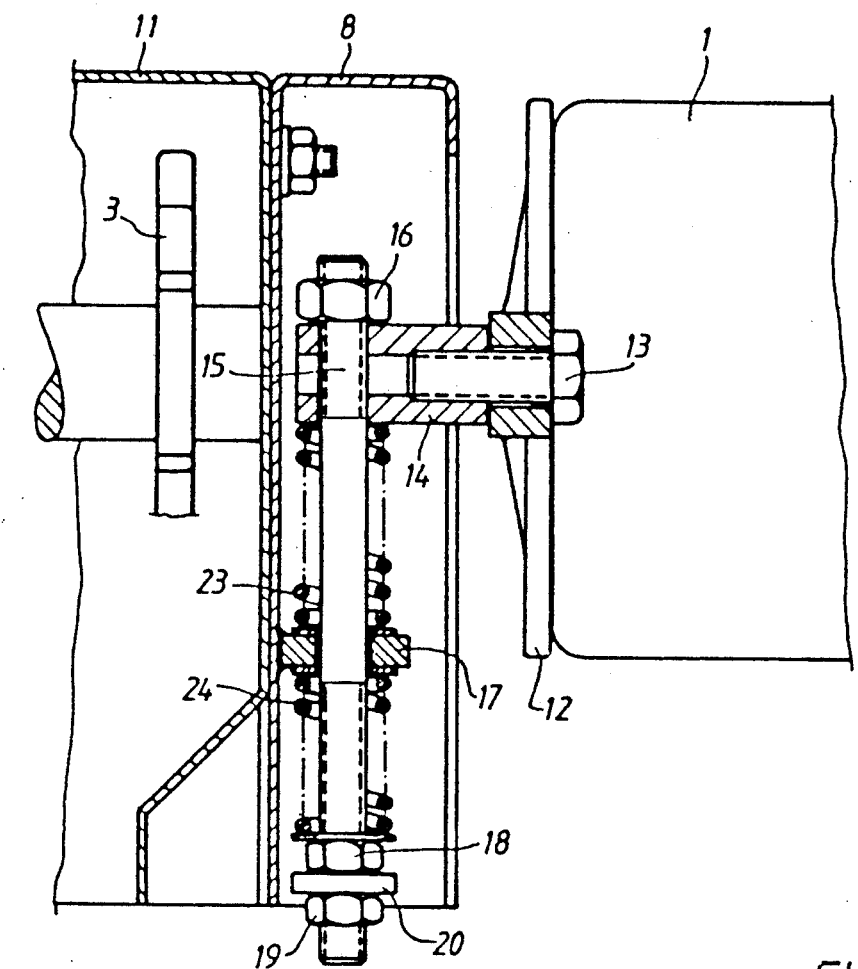

The shavings conveyor illustrated in FIGS. 1-3, which is not illustrated in detail, is driven by a motor (which is not shown), a drive assembly 1, a drive shaft 2 constructed as a hollow shaft and a chain wheel 3 which is connected to the drive shaft 2 and by means of which the continously revolving conveying element 25 constructed as a hinge belt or scraper chain is driven. The connection between the shaft 1a of the drive assembly 1 and the drive shaft 2 is made by means of a stub shaft 4 which is connected by an adjusting spring 5 to the shaft 1a and by a form-locking or force-locking connection, e.g. a shearing pin 6, to the drive shaft 2.

The drive shaft is mounted by means of a bearing 7 in a bearing plate 8 which is fixed for example by means of nuts 9 on bolts 10 which are in turn firmly connected to one side plate 11 of the housing of the shavings conveyor.

A beam 12 is connected to the housing of the drive assembly 1 so as to be fixed against rotation. A threaded sleeve 14, which has the screw 13 screwed into its axial inner thread, is fixed by means of a screw 13 on the beam 12. A threaded bore, which is offset by 90° with respect to the axis of the sleeve and into which a threaded rod 15 is screwed, is provided at the left-hand end (FIG. 3) of the threaded sleeve 14. The connection between the threaded sleeve 14 and the threaded rod 15 can be secured by a counter nut 16 or a securing pin.

The threaded rod 15 is passed so as to be movable through a stationary abutment 17 which is fixed on the bearing plate 8.

At its lower end the threaded rod 15 has an L-shaped clip 20 which is fixed by means of nuts 18, 19 and on which a control cam 21 is provided for actuation of a control switch 22.

A spring element, for example a pressure springs 23, is provided on the threaded rod 15 between the stationary abutment 17 and the threaded sleeve 14. A further spring element, constructed for example as a pressure spring 24, is located between the abutment 17 and the nut 18.

The mechanical parts which are described above of the arrangement for protecting the drive assembly against overloading function as follows:

It may be assumed that the conveying element of the shavings conveyor is constructed as a hinge belt. If in normal operation the conveying element is driven by the drive assembly 1 in a clockwise direction (FIG. 1), the housing 21 the drive assembly, and therefore the beam 12, is urged counterclockwise. This normal counterclockwise reaction torque is resisted by the spring 23. If the conveying element is jammed by a breakdown, for example an accumulation of shavings the drive torque (in the clockwise direction) of the drive assembly (1) greatly increases, and therefore, the counterclockwise reaction torque acting on the beam 12 also increases. As a result the beam 12 of the torque support is deflected counter-clockwise (FIG. 1). Consequently the upper pressure spring 23 is compressed. The threaded rod 15, the clip 20 and the control cam 21 move in the direction of deflection (that is to say downwards in FIG. 1). At a specific deflection of the torque support the control switch 22 is actuated by the control cam 21. The switching operations which follow this actuation of the control switch 22 are explained with the aid of FIG. 4.

Whereas a hinge belt conveyor basically conveys on the upper run of the continuously revolving conveying element, in the case of scraper conveyors the shavings are generally transported by the lower run of the conveying element which is constructed as a scraper chain. Thus in normal operation the direction of rotation of the drive assembly in the case of a scraper conveyor is generally the reverse of the direction of rotation in a hinge belt conveyor.

If the conveying element of the shavings conveyor is constructed as a scraper chain and if a disruption, e.g. an accumulation of shavings, occurs in operation, then the beam 12 of the torque support is deflected in the clockwise direction (FIG. 1). In this case the lower pressure spring 24 is compressed more strongly, so that the threaded rod 15, the clip 20 and the control cam 21 move upwards. At a specific deflection of the torque support the control switch 22 is actuated.

Figure 4:
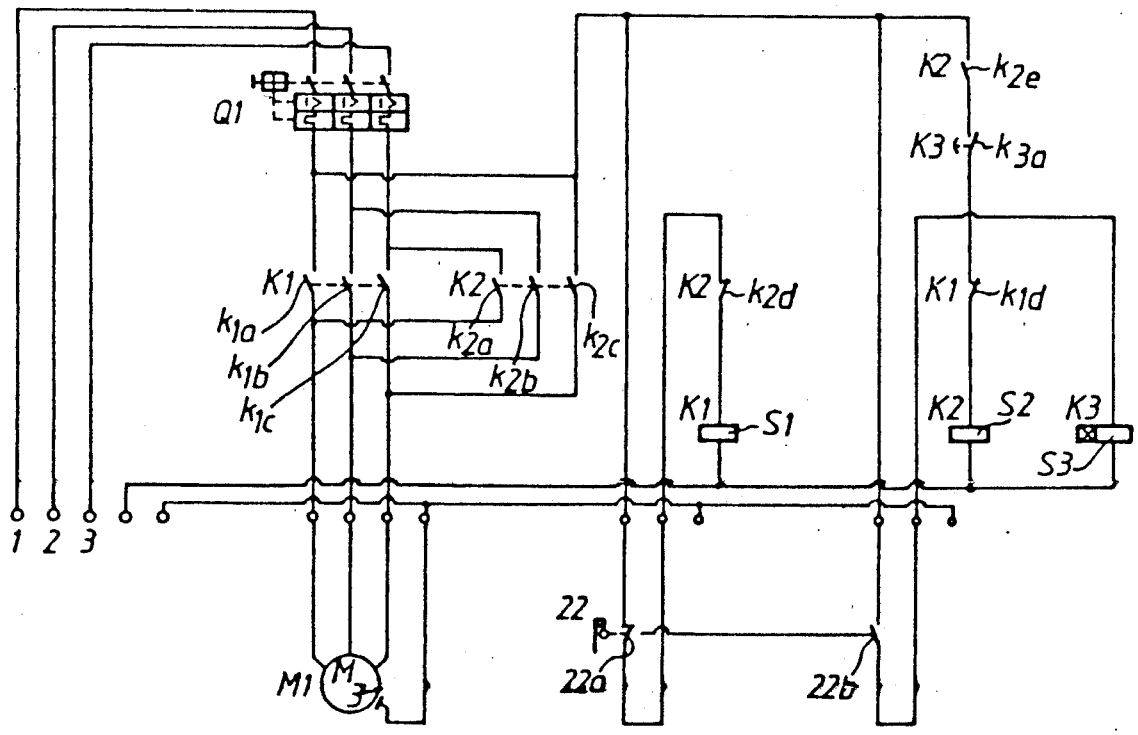
FIG. 4 shows a diagram of the electric circuit belonging to the overload protection arrangement.

The electrical elements of the arrangement for protection against overloading and the switching operations which take place upon actuation of the control switch 22 are explained in greater detail with the aid of FIG. 4.

The circuit according to FIG. 4 shows the drive motor M1, a motor protector Q1, a contactor K1 (with contacts $k_{1a}$, $k_{1b}$, $k_{1c}$, $k_{1d}$ as well as a relay coil S1), and also a reversing contactor K2 (with contacts $k_{2a}$, $k_{2b}$, $k_{2c}$, $k_{2d}$, $k_{2e}$ as well as a relay coil S2), and a timing relay K3 (with a contact $k_{3a}$ as well as a relay coil S3), and also the control switch 22 already mentioned in connection with FIG. 1 (with the contacts 22a, 22b).

The switch according to FIG. 4 functions as follows: If voltage is applied to the contacts 1, 2 and 3 of the main control, then current flows over the closed motor protection Q1 and the closed contacts 22a and $k_{2d}$ to the relay coil S1, so that the contactor K1 pulls up. The motor M1 receives a voltage via the closed contacts $k_{1a}$, $k_{1b}$, $k_{1c}$ so that the shavings conveyor runs on.

If an accumulation of shavings occurs and the control switch 22 is actuated, then the contact 22a opens and the contact 22b closes. Consequently the relay coil S1 is de-energised so that the contacts $k_{1a}$, $k_{1b}$, $k_{1c}$ open. At the same time the relay coil S2 receives a voltage via the closed contacts 22b, $k_{1d}$, so that the contactor K2 pulls up and the contacts $k_{2a}$, $k_{2b}$, $k_{2c}$ close. The drive motor M1 consequently runs backwards.

By means of the contact $k_{2e}$ the contactor K2 goes into self-locking. Therefore the drive motor M1 also runs further backwards if the control switch 22 is no longer actuated (so that the contact 22b is opened again).

Simultaneously with the response of the contactor K2, the relay coil S3 of the time-delayed timing relay K3 also receives a voltage. If the preset time is reached, the timing relay K3 pulls up so that the contact $k_{3a}$. Thus the relay coil S2 of the reversing contactor K2 is de-energised.

If the reversing contactor K2 is de-energised and the control switch 22 is no longer actuated, then the contactor K1 pulls up again so that the motor again runs in the conveying direction.

If the accumulation of shavings has not yet dispersed as a result of this brief reversal of the conveying direction, then the cycle described above can be repeated as often as is required. In this case the motor is sufficiently protected by the motor protection Q1.

It will be understood by those skilled in the art, that the foregoing description relates only to a preferred embodiment of the present invention, and that numerous additions, deletions or modification may be made to the present invention without departure from the spirit and scope of the invention as set forth in the following claims.

We claim:
1. A shavings conveyor comprising
   a) a conveying element,
   b) a drive assembly connected to the conveying element,
   c) an arrangement for protecting the drive assembly against overloading,
   characterised by the following elements of the arrangement for protection against overloading:
   c₁) a torque support beam (12) connected to the housing of the drive assembly and deflectable in response to an accumulation of shavings on the conveying element and having a control cam (21) communicating therewith so as to be movable with the deflection of the torque support beam (12),
   c₂) a control switch (22) which can be actuated by the control cam (21) in response to a specific deflection of the torque support beam (21),
   c₃) a reversing contactor (K2) which responds upon actuation of the control switch (22) and switches the direction of rotation of the drive assembly over so that the conveying element runs backwards,
   c₄) a timing relay (K3) which, an adjustable time after the response of the reversing contactor (K2), switches the direction of rotation of the drive assembly over so that the conveying element again runs forwards.

2. Shavings conveyor as claimed in claim 1, and further including:
   a threaded rod (15) which is connected at one end via a threaded sleeve (14) to the torque support beam (12),
   a stationary abutment (17) through which the threaded rod (15) is extended so as to be movable,
   two prestressed pressure springs (23, 24) which are arranged on the threaded rod (15), are clamped between the abutment (17) and the two ends of the threaded rod and are stressed in opposite directions upon movement of the torque support beam (12).

3. The shavings conveyor as claimed in claim 1, characterised in that the drive assembly contains a shaft (1a) which is connected by a stub shaft (4) to a driven shaft (2), constructed as a hollow shaft, of the conveying element.

4. The Shavings conveyor as claimed in claim 2 characterised in that the pressure springs (23, 24), the threaded rod (15) and the stationary abutment (17) to the torque support beam 12 are arranged in a bearing plate (8) which is set laterally onto the housing (11) of the shavings conveyor and which at the same time contains the bearing (7) for the drive shaft (2) of the conveying element.

5. An apparatus for protecting against the overloading of a shavings conveyor of the type including a conveying element rotating about a substantially continuous processing path, and a drive assembly having a reversible motor attached in driving relationship to the conveying element, comprising:

a deflectable torque support beam (12) linked to the drive assembly of the shavings conveyor;

a threaded rod (15) connected at one end to said torque support beam (12) and having a control cam (21) affixed at its opposite end, movable in the direction of deflection of the torque support beam (12);

a control switch (22) positioned adjacent said control cam (21) attached to said threaded rod (15) in a position to be activated by said control cam (21) as said threaded rod (15) is moved in response to the deflection of said torque support beam (12), for signaling the motor of the drive assembly to reverse the movement of the shavings conveyor; and whereby as the shavings conveyor becomes overloaded by an accumulation of shavings, the increased torque on the drive assembly caused by the accumulation of shavings causes the deflection of said torque support beam (12) which in turn moves said threaded rod (15) such that said control cam (21) attached to said threaded rod (15) engages and activates said control switch (22) which signals the motor of the drive assembly to briefly reverse the direction of movement of the shavings conveyor so as to disperse the accumulation of shavings.

6. The apparatus of claim 5 and further including a reversing contactor (K2) initiated by the actuation of said control switch (22) by said control cam (21) for providing a first signal to the motor to reverse the direction of movement of the shaving conveyor.

7. The apparatus of claim 6 and further including a timing relay (K3) electrically connected to the motor of the drive assembly for providing a second signal to again reverse the direction of movement of the shavings conveyor after a preset period of time, so that the shavings conveyor returns to its original direction of movement.

8. A shavings conveyor, comprising:

a conveying element;

means for driving said conveying element about a substantially continuous processing path connected to said conveying element;

a deflectable torque support beam (12) communicating with said means for driving said conveying element;

a threaded rod (15) attached at one end to said torque support beam (12) and movable in response to the deflection of said torque support beam (12);

a control switch (22) positioned adjacent said threaded rod (15);

a control cam (21) attached to the opposite end of said threaded rod (15) from said torque support beam (12) for activating said control switch (22) as said threaded rod (15) is moved in response to the deflection of said torque support beam (12); and whereby as said conveying element becomes overloaded by an accumulation of shavings, the increased torque on said means for driving said conveying element resulting from the accumulation of shavings causes the deflection of said torque support beam (12), thereby moving said threaded rod (15) so as to engage said control switch (22) with said control cam (21) to signal said means for driving said conveying element to reverse the movement of said conveying element so as to dispose the accumulation of shavings.

9. The shavings conveyor of claim 8 and wherein said means for driving said conveying element comprises a reversible motor.

10. The shavings conveyor of claim 9 and further including a reversing contactor (K2) initiated by the actuation of said control switch (22) by said control cam (21) for providing a first signal to the reversible motor to reverse the direction of movement of said conveying element.

11. The shavings conveyor of claim 10 and further including a timing relay (K3) electrically connected to the reversible motor for providing a second signal to again reverse the direction of movement of the conveying element after a preset period of time, so that the conveying element returns to its original direction of movement.

* * * * *